(12) United States Patent
Tian et al.

(10) Patent No.: US 10,777,150 B2
(45) Date of Patent: Sep. 15, 2020

(54) CONTROLLING METHOD OF DISPLAY DEVICE AND DISPLAY DEVICE

(71) Applicant: Wuhan China Star Optoelectronics Technology Co., Ltd., Wuhan (CN)

(72) Inventors: Weijun Tian, Shenzhen (CN); Hongqing Cui, Shenzhen (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 37 days.

(21) Appl. No.: 16/182,638

(22) Filed: Nov. 7, 2018

(65) Prior Publication Data

US 2019/0371255 A1 Dec. 5, 2019

Related U.S. Application Data

(63) Continuation of application No. PCT/CN2018/101635, filed on Aug. 22, 2018.

(30) Foreign Application Priority Data

May 29, 2018 (CN) .......................... 2018 1 0534404

(51) Int. Cl.
*G09G 3/36* (2006.01)
*G06F 3/041* (2006.01)
*G09G 3/34* (2006.01)

(52) U.S. Cl.
CPC ............. *G09G 3/36* (2013.01); *G06F 3/0412* (2013.01); *G06F 3/0416* (2013.01);
(Continued)

(58) Field of Classification Search
CPC ............. G06F 3/038; G09G 5/00; G09G 3/36
See application file for complete search history.

(56) References Cited

U.S. PATENT DOCUMENTS

2015/0331531 A1* 11/2015 Aoyama ................. G06F 3/044
345/174
2016/0266697 A1 9/2016 Cheng et al.
(Continued)

FOREIGN PATENT DOCUMENTS

CN 103049130 A 4/2013
CN 104503610 A 4/2015
(Continued)

*Primary Examiner* — Pegeman Karimi

(57) ABSTRACT

The present disclosure provides a controlling method of a display device and the display device. The controlling method may include: detecting whether the display device is at the beginning of the touch panel scanning or during the touch panel scanning; and stopping at least one signal/current scanning operation which is different from the display scanning within the display device if at the beginning of the touch panel scanning or during the touch panel scanning. The present disclosure firstly detects the scanning states of the display device, and stops other scanning operations different from the display scanning when the display device performs the touch panel scanning, which can prevent the display device from being affected by other scar ling operations during the touch panel scanning, thus ensuring the normal operation of the touch panel.

20 Claims, 3 Drawing Sheets

(52) U.S. Cl.
CPC ... *G09G 3/3426* (2013.01); *G09G 2320/0247* (2013.01); *G09G 2320/0252* (2013.01); *G09G 2320/0686* (2013.01)

(56) References Cited

U.S. PATENT DOCUMENTS

| | | |
|---|---|---|
| 2016/0299587 A1 | 10/2016 | Huang et al. |
| 2017/0083163 A1 | 3/2017 | Liu et al. |
| 2017/0123537 A1 | 5/2017 | Yen et al. |
| 2017/0140727 A1 | 5/2017 | Xiao |
| 2018/0067592 A1* | 3/2018 | Kimura ................. G02F 1/1343 |
| 2018/0107329 A1 | 4/2018 | Gu et al. |
| 2019/0004643 A1 | 1/2019 | Ma et al. |
| 2019/0235326 A1* | 8/2019 | Li ........................ G09G 3/3677 |

FOREIGN PATENT DOCUMENTS

| | | |
|---|---|---|
| JP | H04350621 A | 12/1992 |
| JP | 2015210696 A | 11/2015 |

\* cited by examiner

CONTROLLING METHOD OF DISPLAY DEVICE AND DISPLAY DEVICE

CROSS-REFERENCE TO RELATED APPLICATIONS

The present application is a continuation-application of International (PCT) Patent Application No. PCT/CN2018/101635 filed on Aug. 22, 2018, which claims foreign priority of Chinese Patent Application No. 201810534404 7, filed on May 29, 2018 in the State Intellectual Property Office of China, the entire contents of which are hereby incorporated by reference.

TECHNICAL FIELD

The present disclosure relates to the field of displaying technologies, and in particular, to a controlling method of a display device and the display device.

BACKGROUND

At present, according to the structure, touch panels can be divided into add-on mode touch panels, on-cell touch panels, and in-cell touch panels. For a liquid crystal display (LCD) with an in-cell touch panel on the common market. LCD data and touch panel (TP) data are time-divisionally scanned for a certain period of time. Since TP scanning is a process of sampling analog signals, which is very sensitive to other scanning interferences. Other scanning may affect the normal operation of TP scanning, which hereby causes jump points and random reporting points in the entire module, and seriously affects the user's usage.

In other words, since the current display device may get affected by other scanning daring the touch panel scanning, the normal operation of the touch panel may be interfered.

SUMMARY

The technical problem to be solved by the present disclosure is to provide a controlling method of a display device and the display device, which can prevent the display device from being affected by other scanning operations during the touch panel scanning, and ensure the normal operation of the touch panel.

In order to solve the above technical problem, a first technical solution adopted by the present disclosure is to provide a controlling method of a display device. The controlling method may include: obtaining a change of a scanning state of a display driving circuit, and pausing a scanning operation of a backlight driving circuit if a scanning state of the display driving circuit switches from a display scanning state to a touch panel scanning state.

In order to solve the above technical problem, a second technical solution adopted by the present disclosure to provide a controlling method of a display device. The controlling method may include: detecting whether the display device is at the beginning of a touch panel scanning or during the touch panel scam and stopping at least one signal/current scanning operation which is different from a display scanning within the display device if at the beginning of the touch panel scanning or during the touch panel scanning.

In order to solve the above technical problem, a third technical solution adopted by the present disclosure is to provide a display device. The display device may include a storage and a processor coupled to each other, with a computer program executable on the processor and stored in the storage. The processor executes the computer program to realize: detecting whether the display device is at the beginning of a touch panel scanning of during the touch panel scanning; and stopping at least one signal/current scanning operation which is different from a display scanning within the display device if at the beginning of the touch panel scanning or during the touch panel scanning.

The beneficial effect of the present disclosure lies in that: different from the prior art, the controlling method of the display device of the present disclosure may include detecting whether the display device is at the beginning of the touch panel scanning or during the touch panel scanning, and stopping at least one signal/current scanning operation which is different from the display scanning within the display device if at the beginning of the touch panel scanning or during the touch panel scanning. The present disclosure firstly detects the scanning states of the display device, and stops other scanning operations different from the display scanning when the display device performs the touch panel scanning, which can prevent the display device from being affected by other scanning operations during the touch panel scanning, thus ensuring the normal operation of the touch panel.

DETAILED DESCRIPTION

The technical solution in the embodiments of the present disclosure will be clearly and completely described below with reference to the accompanying drawings in the embodiments of the present disclosure. Obviously, the described embodiments are merely a part of the embodiments of the present disclosure, not all of the embodiments. All other embodiments obtained by one with ordinary skills in the art based on the embodiments of the present disclosure without any creative efforts shall fall into the protection scope of the present disclosure.

Figure 1:
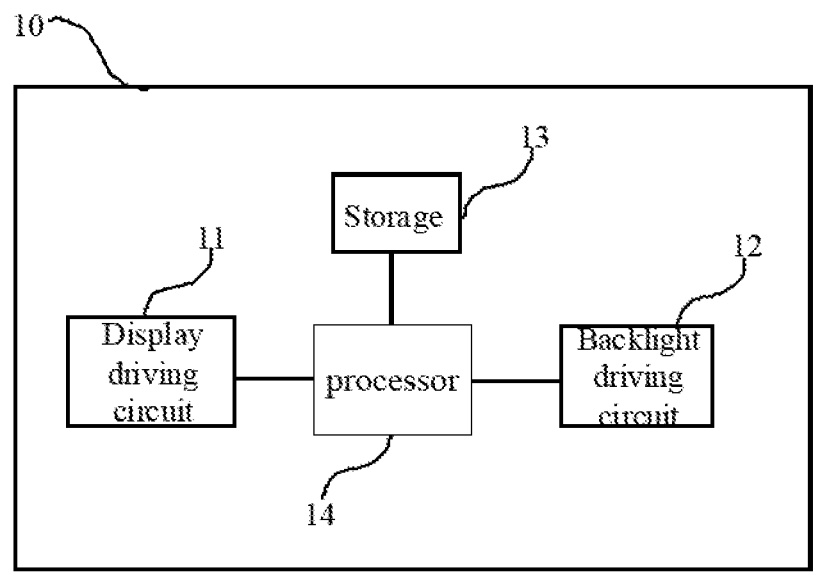
FIG. 1 is a schematic structural diagram illustrating an embodiment of a display device of the present disclosure.

Referring to FIG. 1, FIG. 1 is a schematic structural diagram illustrating an embodiment of a display device of the present disclosure.

As shown in FIG. 1, the display device 10 may include a display driving circuit 11, a backlight driving circuit 12, a storage 13, and a processor 14. The display driving circuit 11, the backlight driving circuit 12, and the storage 13 are respectively coupled to the processor 14. The storage 13 stores a computer program which is executable on the processor 14, and the processor 14 controls the display driving circuit 11 and the backlight driving circuit 12 when the computer program is executed.

In the present embodiment, the display device 10 may be a liquid crystal display device, and the liquid crystal display device is provided with an in-cell touch panel. In other embodiments, the display device 10 may also be other type of display devices, such as an add-on mode touch panel and an on-cell touch panel, which is not limited in this disclosure.

Figure 2:
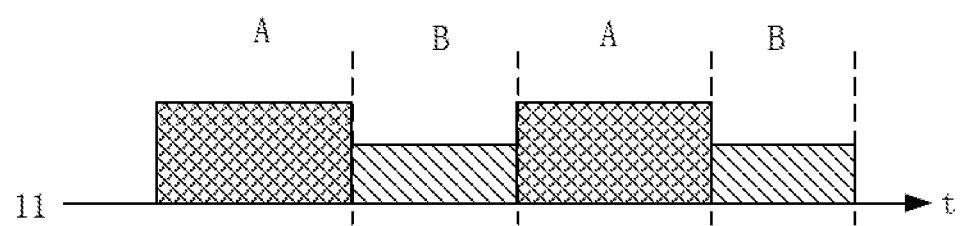
FIG. 2 is a schematic diagram illustrating scanning sequence of a display driving circuit in an embodiment of a display device of the present disclosure.

Referring to FIG. 2, FIG. 2 is a schematic diagram illustrating scanning sequence of a display driving circuit in an embodiment of the display device of the present disclosure. As shown in FIG. 2, after startup, the display driving circuit 11 enters a display scanning state A, and the display driving circuit 11 switches between the display scanning state A and a touch panel scanning state B with time. It should be noted that, the display driving circuit 11 performs display scanning in the display scanning state A and performs touch panel scanning in the touch panel scanning state B. A refresh rate of the display scanning state A may be not less than 60 Hz, and the sum of the time of a display scanning state A and an adjacent touch panel scanning state B may be one frame. The scanning frequency of 60 Hz exceeds the resolution limit of the human eye for flicker, which ensures that the human eye does not feel flickers when viewing the display panel.

In a specific embodiment, after the display driving circuit 11 is activated, the picture data may be refreshed at a rate of 60 Hz, that is, within one minute, the display driving circuit 11 performs 60 times of display scanning and 60 times of touch panel scanning. Within one frame (about 16.67 ms), the display driving circuit 11 performs display scanning for a period of time, then stops the display scanning and starts the touch panel scanning at the same time, then stops the touch panel scanning after the touch panel scanning is completed, and restarts the display scanning, that is, the touch panel scanning and the display scanning are performed in a time-sharing manner. The number of time sharing and the time distribution are determined according to sizes and resolutions of different display devices 10, which is not limited in this disclosure.

Figure 3:
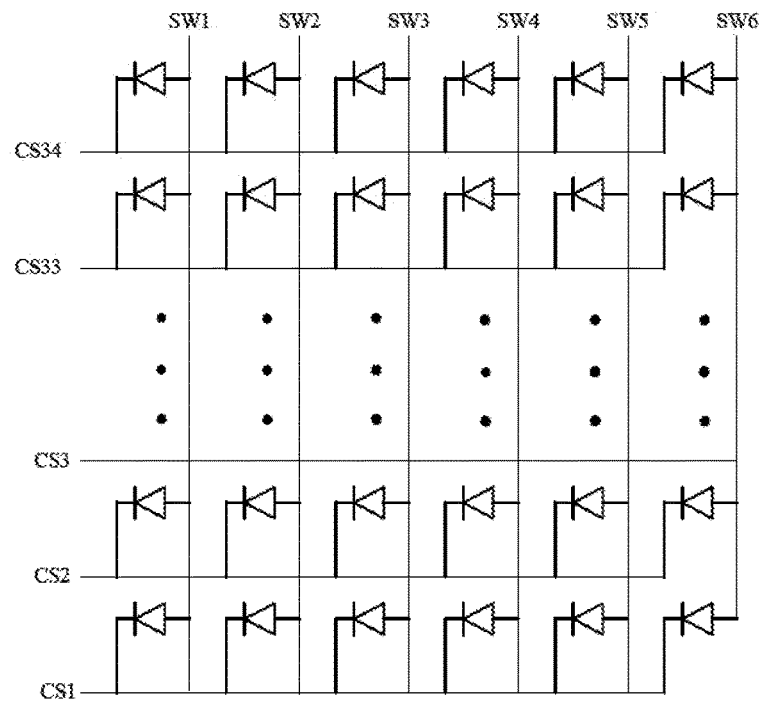
FIG. 3 is a schematic structural diagram illustrating a backlight driving circuit in an embodiment of a display device of the present disclosure.
Figure 4:
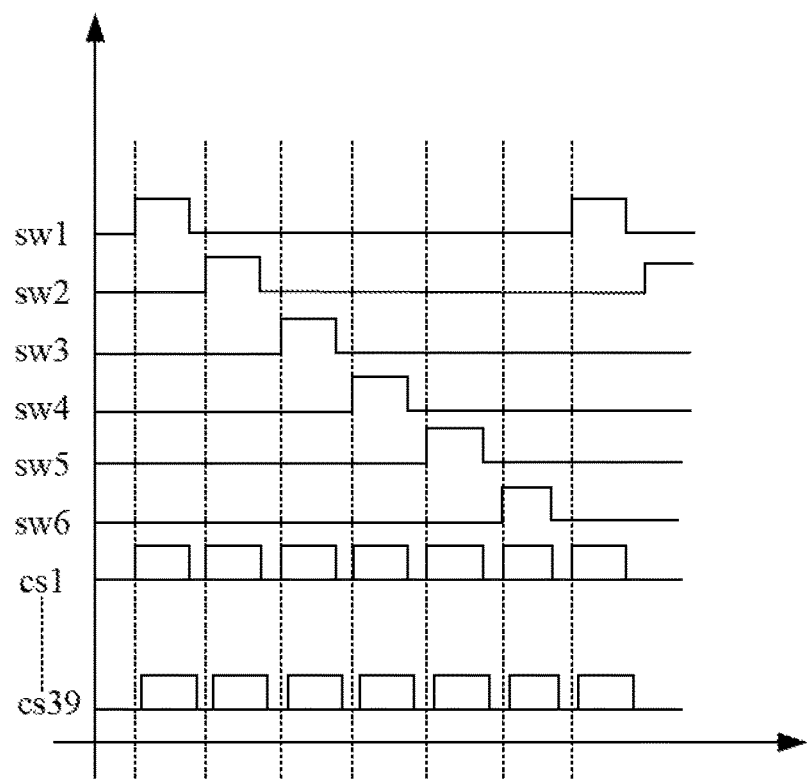
FIG. 4 is a schematic diagram illustrating scanning sequence of a backlight driving circuit in an embodiment of a display device of the present disclosure.

Referring to FIG. 3 and FIG. 4, FIG. 3 is a schematic structural diagram illustrating a backlight driving circuit in an embodiment of the display device of the present disclosure, and FIG. 4 is a schematic diagram illustrating scanning sequence of a backlight driving circuit in an embodiment of the display device of the present disclosure.

As shown in FIG. 3, in the present embodiment, the backlight driving circuit 12 may be a scanning direct illumination-type backlight. The direct illumination-type backlight may be a backlight solution in which a plurality of LED lamps is arranged on a substrate according to a certain array, and all the LEDs are arranged on the substrate in a row-column matrix. A single LED or multiple adjacent LEDs may be referred as a partition in accordance with the connecting state of the positive and negative electrodes of the LEDs. The direct illumination-type backlight can achieve local diming (local backlight adjustment) controlling effect, that is, the entire backlight may be not lighted up at the same time, but may be divided into a plurality of partitions, the brightness of each partition can be individually controlled to match the LCD display. Specifically, when the gray scale of the display of a certain area of the LCD is low, the brightness of the corresponding direct illumination-type backlight partition get lowered accordingly, and when the gray scale of the display in a certain area of the LCD is high, the brightness of the corresponding direct illumination-type backlight partition is also increased. The direct illumination-type backlight dynamically changes the brightness of the partition as the gray scale of the LCD display changes, so that the entire LCD module can perform a more excellent display effect. In order that the direct illumination-type backlight dynamically controls the brightness of the partition, all LED lamps are driven in a row-column scanning method.

Referring to FIG. 3 and FIG. 4, the backlight driving circuit 12 has 34×6 partitions. In other embodiments, the number of partitions may be determined according to actual situation, for example, 34×9 partitions, which is not limited in this disclosure. The scanning driving method of the backlight driving circuit 12 is as follows, Firstly, SW1 is fumed on, the positive electrode of the first column LED gets connected, and at the same time CS1~CS34 are turned on, so that the first column of LED lights is lighted up, then SW1 is turned off, and SW2 is turned on, and the positive electrode of the second column gets connected, and at the same time CS1~CS34 is turned on, so that the second column of LED lamps are lighted up. In this way, SW1 SW2 to SW6 are turned on so that the entire LED is lighted up. After the last column of LEDs is lighted up, it returns to the first column to turn on SW1 and repeat the scanning. When the scanning speed exceeds 60 Hz, the human eye cannot recognize the flicker process of the LED, and the whole LED remains bright. The scanning frequency of the direct scanning backlight can reach a few thousand HZ, far beyond the resolution limit of the human eye for flicker, that is, as long as a scanning frequency more than 60 Hz is obtained, it can be ensured that the human eye does not feel the flicker.

Figure 5:
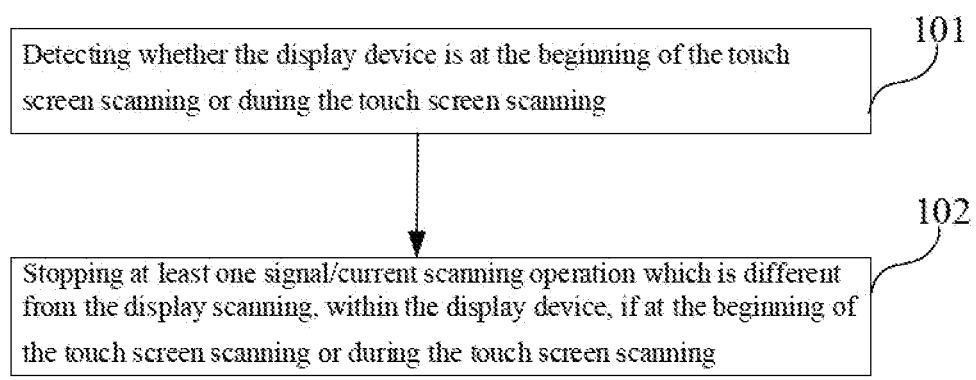
FIG. 5 is a schematic flow chart of an embodiment of a controlling method of a display device according to the present disclosure.
Figure 6:
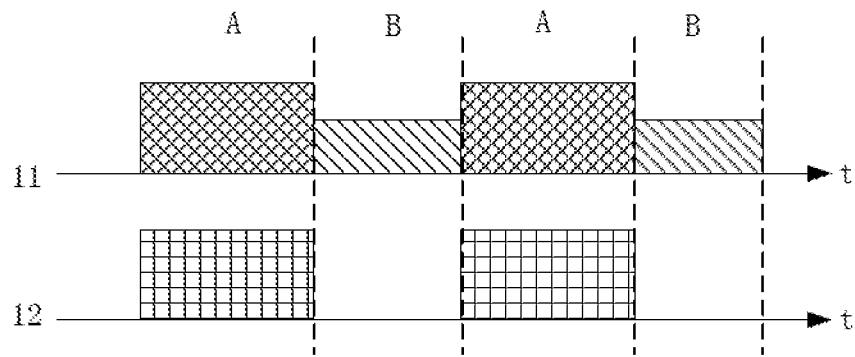
FIG. 6 is a schematic diagram illustrating scanning sequence of a display device in an embodiment of a controlling method of a display device of the present disclosure.

Referring to FIG. 5 and FIG. 6, FIG. 5 is a schematic flow chart of an embodiment of a controlling method of a display device of the present disclosure, and FIG. 6 is a schematic diagram illustrating scanning sequence of a display device according to an embodiment of the controlling method of a display device of the present disclosure. Referring to FIGS. 1-6, the controlling method of the display device 10 may include the following blocks.

In Block 101, the method may include detecting whether the display device is at the beginning of the touch panel scanning or during the touch panel scanning.

In the present embodiment, the processor 14 obtains level changes of a gate signal and a source signal of the display driving circuit 11, and the processor 14 obtains a change of a scanning state of the display driving circuit 11, according to the level changes of the gate signal and the source signal. For example, if the processor 14 obtains that a gate enable voltage (VGH), a gate turn-off voltage (VGL), and a source signal (Vsource) of the display driving circuit 11 are all at a preset value, the processor 14 determines the display driving circuit 11 enters the touch panel scanning state B; if the processor 14 obtains that the gate enable voltage, the gate turn-off voltage, and the source signal of the display driving circuit 11 are not at the preset value, the processor 14 determines that the display driving circuit 11 is not in the touch panel scanning state B.

In block 102, the method may include stopping at least one signal/current scanning that is different from the display scanning in the display device 10, if at the beginning of touch panel scanning or during the touch panel scanning.

In the present embodiment, the processor 14 obtains a change of a scanning state of the display driving circuit 11, and if the processor 14 determines that the scanning state of the display driving circuit 11 switches from the display scanning state A to the touch panel scanning state B, the processor 14 may pause the scanning operation of the backlight driving circuit 12.

In a specific embodiment, the processor 14 obtains a level changes of the gate signal and the source signal of the display driving circuit 11, and the processor 14 obtains the change of a scanning state of the display driving circuit 11 according to the level changes of the gate signal and the source signal of the display driving circuit 11. If the processor 14 determines that the scanning state of the display driving circuit 11 switches from the display scanning state A to the touch panel scanning state B, the processor 14 may pause the scanning operation of the backlight driving circuit 12. For example, the processor 14 obtains a level changes of the gate signal and the source signal of the display driving circuit 11, and if the processor 14 obtains that the gate enable voltage, the gate turn-off voltage, and the source signal of the display driving circuit 11 are all at the preset value, the processor 14 determines that the display driving circuit 11 enters the touch panel scanning state B, and the processor 14 pauses the scanning operation of the backlight driving circuit 12.

In a more specific embodiment, the display driving circuit 11 and the backlight driving circuit 12 are synchronously activated, and the display driving circuit 11 and the backlight driving circuit 12 enter the display scanning state A, then enter the touch panel scanning state B, and switch between the display scanning state A and touch panel scanning state B. In another specific embodiment, the backlight driving circuit 12 starts the scanning within a preset time before the display driving circuit 11 starts scanning, which can effectively avoid the screen delay caused by the backlight scanning being later than the display scantling. The processor 14 obtains level changes of the gate signal and the source signal of the display driving circuit 11, and the processor 14 obtains the change of a scanning state of the display driving circuit 11 according to the level changes of the gate signal and the source signal of the display driving circuit 11. If the processor 14 determines that the scanning state of the display driving circuit 11 switches from the display scanning state A to the touch panel scanning state B, the processor 14 pauses the scanning operation of the backlight driving circuit 12 and resumes the scanning operation of the backlight driving circuit 12 when the touch panel scanning state B ends. Typically, when the touch panel scanning state B ends, the processor 14 controls the backlight driving circuit 12 to continue the scanning operation from the position where the scanning operation of the backlight driving circuit 12 is paused. For example, after power on, the display driving circuit 11 and the backlight driving circuit 12 are synchronously activated, the display driving circuit 11 enters the display scanning state A, the backlight driving circuit 12 enters the scanning state, and the LCD screen is normally displayed. When the data of one frame is scanned to a certain line, if the processor 14 detects that the gate enable voltage (VGH), the gate turn-off voltage (VGL), and the source signal (Vsource) of the display driving circuit 11 reach the preset value, the processor 14 determines that the display driving circuit 11 enters the touch panel scanning state B, the processor 14 temporarily grounds all the output signals of the backlight driving circuit 12, and the backlight driving circuit 12 stops performing scanning operations, and no electromagnetic pulse is generated, thus avoiding interference to touch panel scanning. As the touch panel scanning state B ends, the backlight driving circuit 12 switches from the touch panel scanning state B to the display scanning state A, the gate enable voltage (VGH) the gate turn-off voltage (VGL), and the source signal (Vsource) change, the backlight driving circuit 12 is restarted, and then the scanning is continued at the position where the backlight driving circuit 12 is paused previously. At this time, the touch panel scanning has ended, and the scanning of the backlight driving circuit 12 does not interfere with the touch panel scanning, which ensures the normal operation of the touch panel scanning.

In other embodiments, the paused signal/current scanning operation may also be other scanning operations different from the display scanning, and is not limited to the backlight scanning, and the backlight scanning manner may also be a side-type backlight, which is not limited herein.

Different from the prior art, the controlling method of the display device 10 of the present disclosure may include: detecting whether the display device 10 is at the beginning of the touch panel scanning or during the touch panel scanning; and stopping at least one signal/current scanning operation which is different from the display scanning within the display device if at the beginning of the touch panel scanning or during the touch panel scanning. The present disclosure firstly detects the scanning states of the display device 10, and stops other scanning operations different from the display scanning when the display device 10 performs the touch panel scanning, which can prevent the display device 10 from being affected by other scanning operations during the touch panel scanning, thus ensuring the normal operation of the touch panel.

Figure 7:
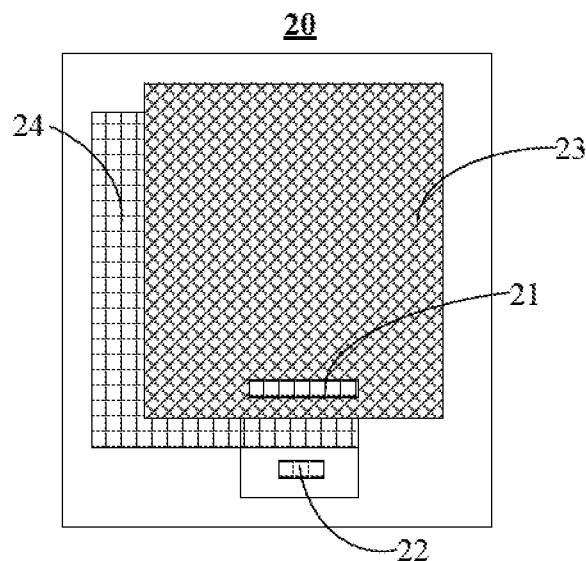
FIG. 7 is a schematic structural diagram illustrating another embodiment of a display device of the present disclosure.

Referring to FIG. 7, FIG. 7 is a schematic structural diagram illustrating another embodiment of a display device of the present disclosure. As shown in FIG. 7, the display device 20 may include a display driving circuit 21, a backlight driving circuit 22, a display panel 23, a backlight 24, and a processor (not shown). The display driving circuit 21 may be configured to drive the display panel 23 to display a screen, and switches between the touch panel scanning state and the display scanning state. The scanning sequence chart of the display driving circuit 21 relay be the same with FIG. 2 and will not be described herein again. The backlight driving circuit 22 may be configured to drive the backlight 23 to provide a backlight to the display panel 23. The schematic diagram of the backlight driving circuit 22 may be the same with FIG. 3, the scanning sequence chart of the backlight driving circuit 22 may be the same with FIG. 4, and the scanning sequence chart of the display device 20 may be the same with FIG. 6, and those will not be described herein again. After receiving the touch panel scanning synchronization signal of the display driving circuit 21, the processor transmits a signal to the backlight driving circuit 22 to control the display panel 23 and the backlight 24.

In the present embodiment, after power on, the display driving circuit 21 and the backlight driving circuit 22 are synchronously activated, and the display driving circuit 21 and the backlight driving circuit 22 enter the display scanning state A, then enter the touch panel scanning state B, and switch between the display scanning state A and touch panel scanning state B. When the display driving circuit 21 enters the display scanning state A, the backlight driving circuit 22 drives the backlight 22 to perform backlight scanning, so as to provide, a backlight to the display panel 23, and the display driving circuit 21 drives the display panel 23 to perform display scanning to display a screen. When the data of one frame is scanned to a certain line, and the processor detects that the gate enable voltage (VGH), the gate turn-off voltage (VGL), and the source signal (Vsource) of the display driving circuit 21 reach a preset value, then, the processor determines that the display driving circuit 21 enters the touch panel scanning state B, and the processor temporarily grounds all the output signals of the backlight driving circuit 22, and the backlight driving circuit 22 stops performing the scanning operation, and no electromagnetic pulses is generated, thereby avoiding the interference to touch panel scanning. As the state of the touch panel scanning state B ends, the backlight driving circuit 22 switches from the touch panel scanning state B to the display scanning state A, the gate enable voltage (VGH), the gate turn-off voltage (VGL), and the source signal (Vsource) change, the backlight driving circuit 22 is restarted, and then the scanning is continued at the position where the backlight driving circuit 22 is paused previously. At this time, the touch panel scanning has ended, and the scanning of the backlight driving circuit 22 does not interfere with the touch panel scanning, which ensures the normal operation of the touch panel scanning.

Different from the prior art, the controlling method of the display device of the present disclosure may include: detecting whether the display device is at the beginning of the touch panel scanning or during the touch panel scanning: and stopping at least one signal/current scanning operation which is different from the display scanning within the display device if at the beginning of the touch panel scanning or during the touch panel scanning. The present disclosure firstly detects the scanning states of the display device, and stops other scanning operations different from the display scanning when the display device performs the touch panel scanning, which can prevent the display device from being affected by other scanning operations during the touch panel scanning, thus ensuring the normal operation of the touch panel.

In the several embodiments provided by the present disclosure, it should be understood that the disclosed methods and apparatus might be implemented in other manners. For example, the in implementation means of the apparatus described above are merely illustrative, for example, the division of modules or units is merely one logical function division, and in actual implementation, there may be another division manner, for example, multiple units or components may be combined or be integrated into another system, or sonic features can be ignored or not executed. In addition, the coupling or direct coupling or communication connection shown or discussed may be an indirect coupling or communication connection through some interface, apparatuses or units, and may be electrical, mechanical or in other manners.

The above description depicts merely some exemplary embodiments of the disclosure, but is not meant to limit the scope of the disclosure. Any equivalent structure or flow transformations made according to the disclosure, or any direct or indirect applications of the disclosure on other related fields, shall all fall into the protection scope of the disclosure.

What is claimed is:

1. A controlling method of a display device, comprising:
obtaining a change of a scanning state of a display driving circuit; and
pausing a scanning operation of a backlight driving circuit for a backlight if the scanning state of the display driving circuit switches from a display scanning state to a touch panel scanning state;
wherein the controlling method further comprises:
obtaining a gate enable voltage, a gate turn-off voltage, and a source signal of the display driving circuit, to determine whether the display driving circuit enters the touch panel scanning state;
when the gate enable voltage, the gate turn-off voltage, and the source signal are all at a preset value, the display driving circuit enters the touch panel scanning state; or
when the gate enable voltage, the gate turn-off voltage, and the source signal are not at the preset value, the display driving circuit does not enter the touch panel scanning state.

2. The controlling method according to claim 1, wherein after pausing a scanning operation of a backlight driving circuit, the method comprises:
resuming the scanning operation of the backlight driving circuit when the touch panel scanning state ends.

3. The controlling method according to claim 2, wherein after resuming the scanning operation of the backlight driving circuit, the method comprises:
continuing the scanning operation from a position where the scanning operation of the backlight driving circuit is paused, when the touch panel scanning state ends.

4. The controlling method according to claim 1, wherein obtaining a change of a scanning state of a display driving circuit specifically comprises:
obtaining level changes of a gate signal and a source signal of the display driving circuit; and
pausing a scanning operation of a backlight driving circuit specifically comprises:
pausing the scanning operation of the backlight driving circuit if levels of the gate signal and the source signal of the display driving circuit change to preset values.

5. The controlling method according to claim 4, wherein before obtaining level changes of a gate signal and a source signal of the display driving circuit, the method comprises:
the display driving circuit and the backlight driving circuit scanning synchronously, the display driving circuit and the backlight driving circuit first performing the display scanning, then performing the touch panel scanning, and the display scanning and the touch panel scanning alternately switching.

6. The controlling method according to claim 4, wherein before obtaining level changes of a gate signal and a source signal of the display driving circuit, the method comprises:
the backlight driving circuit beginning the scanning within a preset time before the display driving circuit beginning scanning.

7. The controlling method according to claim 1, wherein the display scanning state has a refresh rate not less than 60 Hz, a sum of time of a display scanning state and an adjacent touch panel scanning state is one frame, and the backlight is a scanning direct illumination-type backlight.

8. A controlling method of a display device, comprising:
detecting whether the display device is at the beginning of a touch panel scanning or during the touch panel scanning; and
stopping at least one signal/current scanning operation which is different from the display scanning within the display device if at the beginning of the touch panel scanning or during the touch panel scanning;
wherein the controlling method further comprises:
obtaining a gate enable voltage, a gate turn-off voltage, and a source signal of a display driving circuit of the display device, to determine whether the display device is at the beginning of the touch panel scanning or during the touch panel scanning;
when the gate enable voltage, the gate turn-off voltage, and the source signal are all at a preset value, the display device is at the beginning of the touch panel scanning or during the touch panel scanning; or when the gate enable voltage, the gate turn-off voltage, and the source signal are not at the preset value, the display device is not at the beginning of the touch panel scanning or during the touch panel scanning.

9. The controlling method according to claim 8, wherein detecting whether the display device is at the beginning of the touch panel scanning or during the touch panel scanning comprises:

obtaining a change of a scanning state of the display driving circuit; and stopping at least one signal/current scanning operation which is different from the display scanning within the display device if at the beginning of the touch panel scanning or during the touch panel scanning comprises:

pausing a scanning operation of a backlight driving circuit for a backlight if a scanning state of the display driving circuit switches from a display scanning state to a touch panel scanning state.

10. The controlling method according to claim 9, wherein after pausing a scanning operation of a backlight driving circuit, the method comprises:

resuming the scanning operation of the backlight driving circuit when the touch panel scanning state ends.

11. The controlling method according to claim 10, wherein after resuming the scanning operation of the backlight driving circuit when the touch panel scanning state ends, the method comprises:

continuing the scanning operation from a position where the scanning operation of the backlight driving circuit is paused when the touch panel scanning state ends.

12. The controlling method according to claim 9, wherein obtaining a change of a scanning state of a display driving circuit specifically comprises:

obtaining level changes of a gate signal and a source signal of the display driving circuit; and pausing a scanning operation of the backlight driving circuit specifically comprises:

pausing the scanning operation of the backlight driving circuit if levels of the gate signal and the source signal of the display driving circuit change to preset values.

13. The controlling method according to claim 12, wherein before obtaining the level changes of the gate signal and the source signal of the display driving circuit, the method comprises:

the display driving circuit and the backlight driving circuit scanning synchronously, the display driving circuit and the backlight driving circuit first performing the display scanning, then performing the touch panel scanning, and the display scanning and the touch panel scanning alternately switching.

14. The controlling method according to claim 12, wherein before obtaining the level changes of the gate signal and the source signal of the display driving circuit, the method comprises:

the backlight driving circuit beginning the scanning within a preset time before the display driving circuit beginning scanning.

15. The controlling method according to claim 9, wherein a refresh rate of the display scanning state is not less than 60 Hz, a sum of time of a display scanning state and an adjacent touch panel scanning state is one frame, and the backlight is a scanning direct illumination-type backlight.

16. A display device, comprising a storage and a processor coupled to each other, with a computer program executable on the processor and stored in the storage, the processor executing the computer program to realize:

detecting whether the display device is at the beginning of a touch panel scanning or during the touch panel scanning; and stopping at least one signal/current scanning operation which is different from the display scanning within the display device if at the beginning of the touch panel scanning or during the touch panel scanning;

wherein the controlling method further comprises:

obtaining a gate enable voltage, a gate turn-off voltage, and a source signal of a display driving circuit of the display device, to determine whether the display device is at the beginning of the touch panel scanning or during the touch panel scanning;

when the gate enable voltage, the gate turn-off voltage, and the source signal are all at a preset value, the display device is at the beginning of the touch panel scanning or during the touch panel scanning; or when the gate enable voltage, the gate turn-off voltage, and the source signal are not at the preset value, the display device is not at the beginning of the touch panel scanning or during the touch panel scanning.

17. The display device according to claim 16, wherein detecting whether the display device is at the beginning of the touch panel scanning or during the touch panel scanning comprises:

obtaining a change of a scanning state of the display driving circuit; and stopping at least one signal/current scanning operation which is different from the display scanning within the display device if at the beginning of the touch panel scanning or during the touch panel scanning comprises:

pausing a scanning operation of a backlight driving circuit for a backlight if a scanning state of the display driving circuit switches from a display scanning state to a touch panel scanning state.

18. The display device according to claim 17, wherein after pausing a scanning operation of a backlight driving circuit if a scanning state of the display driving circuit switches from a display scanning state to a touch panel scanning state, comprises:

resuming the scanning operation of the backlight driving circuit when the touch panel scanning state ends.

19. The display device according to claim 18, wherein after resuming the scanning operation of the backlight driving circuit when the touch panel scanning state ends, comprises:

continuing the scanning operation from a position where the scanning operation of the backlight driving circuit is paused, when the touch panel scanning state ends.

20. The display device according to claim 17, wherein a refresh rate of the display scanning state is not less than 60 Hz, and a sum of time of a display scanning state and an adjacent touch panel scanning state is one frame, and the backlight is a scanning direct illumination-type backlight.

* * * * *